(12) United States Patent
Nagao et al.

(10) Patent No.: US 7,473,569 B2
(45) Date of Patent: Jan. 6, 2009

(54) MANUFACTURING METHOD FOR THREE-DIMENSIONAL STRUCTURAL BODY

(75) Inventors: Daisuke Nagao, Nakai-machi (JP); Takayuki Yamada, Ebina (JP); Mutsuya Takahashi, Ebina (JP); Hiroyuki Hotta, Ebina (JP); Takashi Ozawa, Nakai-machi (JP); Teiichi Suzuki, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 738 days.

(21) Appl. No.: 10/769,783

(22) Filed: Feb. 3, 2004

(65) Prior Publication Data

US 2004/0234231 A1 Nov. 25, 2004

(30) Foreign Application Priority Data

May 21, 2003 (JP) ............................. 2003-143530

(51) Int. Cl.
    *H01L 21/00* (2006.01)
(52) U.S. Cl. .......................................... 438/22; 438/29
(58) Field of Classification Search ................... 438/14, 438/16, 22, 29, 31, 32; 385/131
    See application file for complete search history.

(56) References Cited

U.S. PATENT DOCUMENTS

| 6,865,005 | B2* | 3/2005 | Aoki et al. ................... 359/237 |
| 6,977,768 | B2* | 12/2005 | Yamaguchi ................. 359/326 |
| 7,295,745 | B2* | 11/2007 | Uchida ....................... 385/129 |
| 7,310,468 | B2* | 12/2007 | Kittaka et al. ............... 385/131 |
| 2005/0122568 | A1* | 6/2005 | Aoki et al. ................... 359/321 |
| 2005/0207717 | A1* | 9/2005 | Takagi et al. ................ 385/129 |
| 2005/0229737 | A1* | 10/2005 | Tsuno et al. ............. 74/490.09 |
| 2006/0029349 | A1* | 2/2006 | Hoshi et al. ................. 385/129 |
| 2006/0245716 | A1* | 11/2006 | Uchida ....................... 385/147 |
| 2007/0025682 | A1* | 2/2007 | Takagi et al. ................ 385/147 |
| 2007/0031108 | A1* | 2/2007 | Sugita et al. ................ 385/147 |

FOREIGN PATENT DOCUMENTS

| JP | B2 3161362 | 2/2001 |
| JP | A 2001-160654 | 6/2001 |

OTHER PUBLICATIONS

Aoki et al, "Three-dimensional photonic crystals for optical wavelengths assembled by micromanipulation", Applied Physics Letters, vol. 81, No. 17, Oct. 21, 2002, pp. 3122-3124.

Yablonovitch, "Inhibited Spontaneous Emission in Solid-State Physics and Electronics", Physical Review Letters, vol. 58, No. 20, May 18, 2987, pp. 2059-2062.

(Continued)

*Primary Examiner*—S. V Clark
(74) *Attorney, Agent, or Firm*—Oliff & Berridge, PLC (57) ABSTRACT

A manufacturing method for a three-dimensional structural body includes sequentially bonding/transferring and laminating plural cross-sectional form members, each held in space above a first substrate through a coupling member and a frame member and corresponding to a slice pattern of the three-dimensional structural body, onto a second substrate.

19 Claims, 6 Drawing Sheets

OTHER PUBLICATIONS

Kosaka et al, "Anisotropic Dispersion in Photonic Crystals—Super-Prism Phenomena", 17p-T-13 (1998).

Joannopoulos et al, "Photonic Crystal", Princeton University Press, 1995, p. 100-104.

Baba et al, "Photonic crystals and their applications", Yokohama National University, 1998, pp. 1041-1045.

Kawakami, Photonic Crysteal Technique and Its Application, CMC Publication, Chapter 11, 2002, pp. 157-169.

* cited by examiner

(SURFACE CLEANING) (SURFACE-ACTIVATED BONDING) (RUPTURING OF COUPLING MEMBER)

FIG. 4D  FIG. 4E  FIG. 4F

(SURFACE CLEANING) (SURFACE-ACTIVATED BONDING) (RUPTURING OF COUPLING MEMBER)

FIG. 4G (RUPTURING OF COUPLING MEMBER)

FIG. 5A

FIG. 5B (CELL 51)

FIG. 5C (CELL 52)

MANUFACTURING METHOD FOR THREE-DIMENSIONAL STRUCTURAL BODY

BACKGROUND OF THE INVENTION

1. Field of the Invention

The present invention relates to a manufacturing method for a three-dimensional structural body which is used as an optical waveguide, an optical resonator, a near-field optical probe, a birefrigent element, a filter, a branching element, a wavefront converter or a polarizer in the field of optical communication, optical interconnection, optoelectronics, or optical measurement and includes a diffraction-type optical element, a multilayer film having a periodic structure, a photonic crystal and the like.

2. Description of the Related Art

It is conventionally known that a medium in which the distribution of refractivity has a periodic structure with a pitch nearly equal to the wavelength of light, has a unique light propagation characteristic. As a medium having a one-dimensional periodic structure, a dielectric multilayer film is known for a long time, and its design theory and manufacturing technique are already in a mature field.

On the other hand, a method for controlling spontaneous emission in a semiconductor element by using a medium having a three-dimensional periodic structure with a pitch nearly equal to the wavelength of light was proposed in 1987 by E. Yablonovitch, Phys. Rev. Lett., vol. 58, (1987), P2059-P2062, and since then, attention has been paid to the behavior of light in a two-dimensional or three-dimensional periodic structural medium.

In such a medium, the propagation of light having a wave vector in a specific range is inhibited, and a photonic band similar to an energy band of an electron in a semiconductor is formed. A periodic refractivity structure forming the photonic band is called a photonic crystal.

When the photonic band is used, novel control of a photon becomes possible, and therefore, various applications are expected. There are already proposed applications to a laser having a low threshold or no threshold by control of spontaneous emission light (Baba et al., Applied Physics, vol. 67, (1988), P1041-P1045), an optical waveguide using a property that light localizes around a lattice defect in a photonic crystal (J. D. Joannopoulos et al., Photonic Crystal, Princeton University Press, (1995 Princeton, N.J.), P100-P104), a micro-miniature optical resonator using the localization of light and having high efficiency and the order of μm (Baba et al., Applied Physics, vol. 67, (1988), P1041-P1045), an element having a new prism function in which a deflection angle is greatly changed by a very small change of a wavelength or an incident angle (Kosaka et. al., 59th Japan Society of Applied Physics Lecture Meeting Collected Preprint (Ouyou Butsuri Gakkai Gakujutsu Kouenkai Yokoushu) III, 17p-T-13, (1998), P920), and the like.

Although the individual elements of these optical elements have various optical functions such as emission control of light, propagation control, prism function, filter function, and optical waveguide, when they are further combined with a light emitting element and a light receiving element, various electronic functions and optical functions appear.

In the photonic crystal, a three-dimensional photonic crystal is most desirable as a structure in which a photonic band effect is obtained most. Besides, in the three-dimensional photonic crystal, a structure is desirable in which a complete photonic band gap can be obtained, and a defect can be inserted relatively easily and freely into the three-dimensional photonic crystal. However, there are relatively few fabrication methods for the three-dimensional photonic crystal as described above in which the complete photonic band gap can be obtained and the defect can be freely inserted, and its fabrication is very difficult. As a conventional fabrication technique which can obtain such a complete photonic band gap and can freely insert a defect into the three-dimensional photonic crystal, for example, there is a fabrication method (first method) disclosed in Directed by Shoujiro Kawakami, Photonic Crystal Technique and Its Application, CMC Publication, Chapter 11, 2002 or APPLIED PHYSICS LETTERS VOLUME 81, NUMBER 17, pp 3122-3124, 2002.

In this method, a two-dimensional microplate with an air bridge structure fabricated using a semiconductor micromachining process and an undercut etching is previously fabricated on a substrate, the microplate is separated from the substrate by a micro-manipulator, the microplate separated from the substrate is subjected to adsorption, transfer, and position fine adjustment by the micro-manipulator again and is laminated. This process is repeated to perform laminating, so that the three-dimensional photonic crystal is fabricated.

As another method (second method) for manufacturing a three-dimensional periodic structural body, there is a method of repeating a process in which a slice pattern of the three-dimensional periodic structural body is formed on a support substrate, and another substrate (target substrate) is pressed against the slice pattern from above to perform transfer (JP-A-2001-160654, Japanese Patent No. 3161362).

However, in the first method, although it is possible to freely introduce the defect, since the micro-manipulation is used, many steps are required for one structure of the microplate subjected to the micromachining and constituting the photonic crystal. Thus, for the fabrication of the three-dimensional photonic crystal, it is necessary to perform the steps several times equal to the number of times of lamination, and a long time and a large number of steps are required for the fabrication of one photonic crystal. Further, when the manipulator is brought close to the individually cut cross-sectional form members, the respective members are attracted by or repelled from the manipulator by the interaction such as electrostatic force, intermolecular force, or magnetic force, so that the arrangements and directions become irregular, and much labor is required to adjust and laminate these, which is not efficient.

Besides, in the second method, in order to ensure the transfer of the slice pattern from the support substrate to the target substrate, it is desirable to form a peeling layer between the slice pattern and the support substrate. However, the combination of the material functioning as the peeling layer and the material enabling film formation on the peeling layer is limited, and there is a problem that the selection of materials constituting the three-dimensional periodic structural body is limited.

For example, although a laser or an LED using the photonic crystal is proposed, in the case where such an active element is formed of the photonic crystal, a semiconductor material is desired as a material constituting this, and the crystallinity of the semiconductor material greatly influences the characteristic of the laser or the LED. However, in the case where resin such as polyimide is used as the peeling layer, it becomes difficult to form a semiconductor film having high crystallinity on the layer, so that it becomes difficult to efficiently manufacture the photonic crystal containing the high crystallinity semiconductor as its construction material.

SUMMARY OF THE INVENTION

The present invention has been made in view of the above circumstances and provides a manufacturing method for a three-dimensional structural body, which addresses the above problem and can manufacture the three-dimensional structural body efficiently based on free design while the limitation of construction material is reduced.

In order to address the above problem, according to an aspect of the present invention, a manufacturing method for a three-dimensional (periodic) structural body includes a step of sequentially bonding/transferring and laminating plural cross-sectional form members, each held in space above a first substrate through a holding member and corresponding to a slice pattern of the three-dimensional (periodic) structural body, onto a second substrate.

BRIEF DESCRIPTION OF THE DRAWINGS

Preferred embodiments of the present invention will be described in detail based on the following figures, wherein:

FIGS. 1A and 1B are views showing a pattern member used for a manufacturing method for a three-dimensional structural body of the invention, in which

FIGS. 2A to 2C are views showing an example of a holding state of a cross-sectional form member, in which

DETAIL DESCRIPTION OF THE INVENTION

Embodiment 1

In this embodiment, as a three-dimensional structural body, a so-called woodpile type three-dimensional photonic crystal is fabricated. This three-dimensional photonic crystal is constructed by laminating plural patterns each having an air bridge structure made of one kind of thin film material and air or vacuum, while a position is shifted in a lateral direction.

Figure 1A:
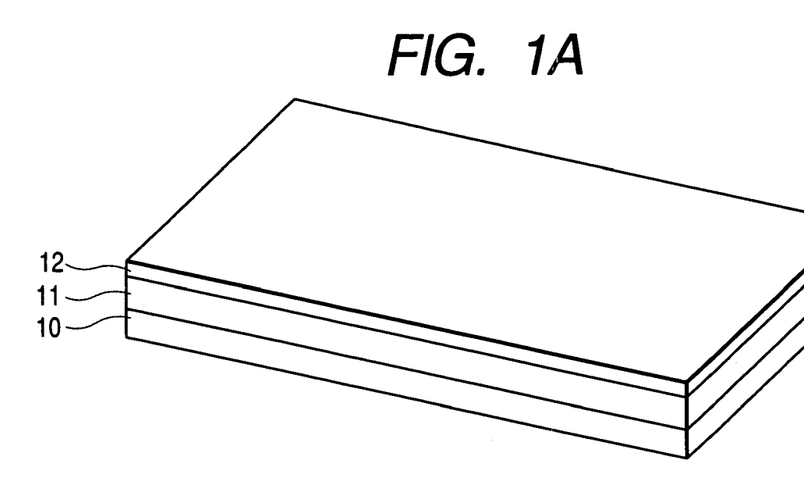
FIG. 1A is a view showing the pattern member before working thereof.
Figure 1B:
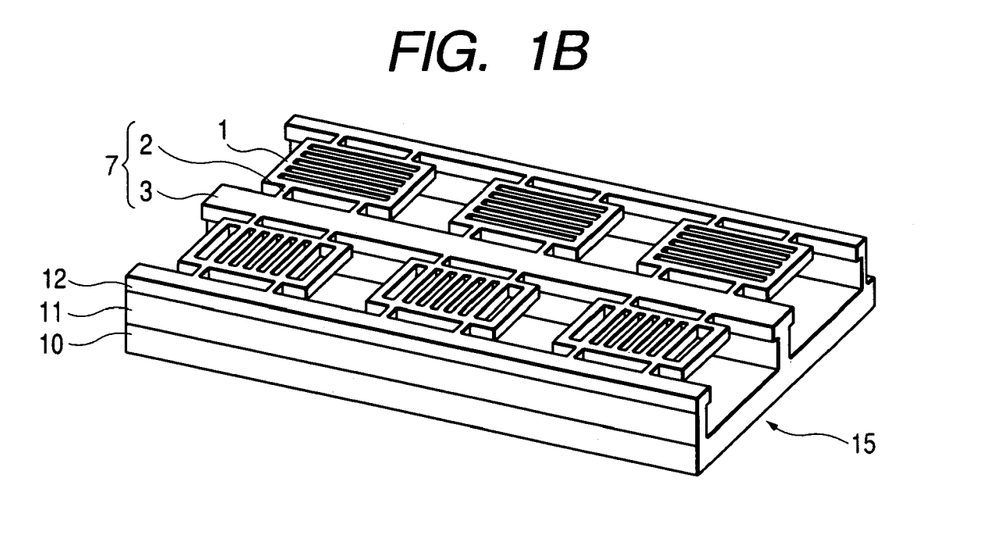
FIG. 1B is a view showing the pattern member after working thereof.

FIGS. 1A and 1B are views showing a pattern member used for a manufacturing method for a three-dimensional structural body of the invention, in which FIG. 1A is a view showing the pattern member before working thereof, and FIG. 1B is a view showing the pattern member after working thereof. As shown in FIG. 1A, this multilayer film is constituted by InP/InGaAs/InP, and an InGaAs spacer layer 11 (sacrificial layer) and an InP layer 12 are obtained by sequentially growing on an InP substrate as a first substrate 10 by an MOCVD method. From this multilayer film of InP/InGaAs/InP, a pattern member 15 having cross-sectional form members is fabricated by using a semiconductor micromachining process as follows. As shown in FIG. 1B, first, plural cross-sectional form members 1 each having a two-dimensional minute structure are fabricated in the MOCVD growth InP layer 12 by electron beam exposure and dry etching. At this time, coupling members 2 connected to the cross-sectional form members 1 and frame members 3 for holding the cross-sectional form members 1 through the coupling members 2 are fabricated at the same time. The coupling member 2 and the frame member 3 constitute a holding member 7 of the cross-sectional form member 1. Directions of stripe patterns of the cross-sectional form members are formed to cross each other at right angles, and by this, two kinds of patterns disposed to develop respective layers of the photonic crystal are fabricated on the first substrate. Next, by undercut etching, the InGaAs spacer layer 11 in the lower layer of the cross-sectional form members 1 and the coupling members 2 is removed. By this, the cross-sectional form members 1 are held in space by the frame members 3 through the coupling members 2.

Figure 2A:
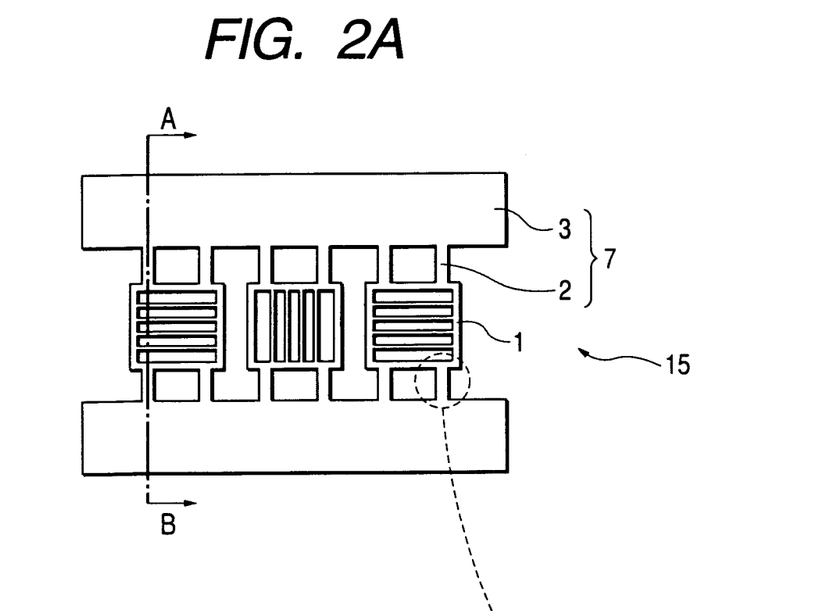
FIG. 2A is a plan view.
Figure 2B:
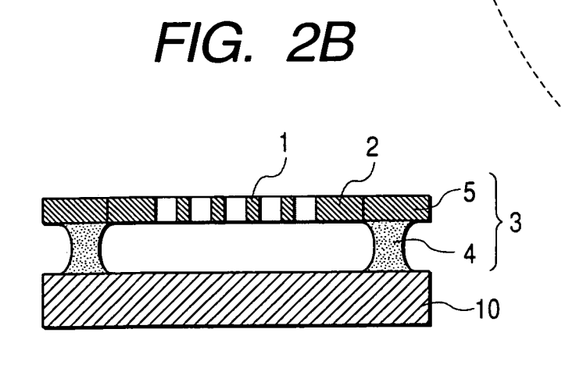
FIG. 2B is a sectional view taken along A-B of FIG. 2A.
Figure 2C:
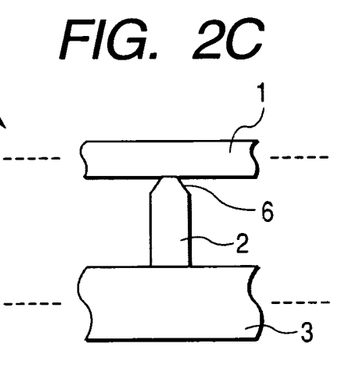
FIG. 2C is a partial enlarged view of FIG. 2A.

FIGS. 2A to 2C are views showing an example of a holding state of the cross-sectional form members, in which FIG. 2A is a plan view, FIG. 2B is a sectional view taken along A-B of FIG. 2A, and FIG. 2C is a partial enlarged view of FIG. 2A. As shown in FIG. 2A, the stripe patterns of the adjacent cross-sectional form members 1 of this embodiment are formed to cross each other at right angles. The frame member 3 includes a columnar part 4 and a frame part 5, and as shown in FIG. 2B, it has a sufficiently wide width to such a degree (to such a degree the columnar member 4 remains) that all the InGaAs layer 11 of the under layer is not removed by the step of the under etching. Besides, as shown in FIG. 2C, the coupling member 2 is formed such that a connection part 6 to the cross-sectional form member 1 is tapered. This is for the purpose of facilitating the cutting off of the cross-sectional form member 1 from the coupling member 2.

Figure 3A:
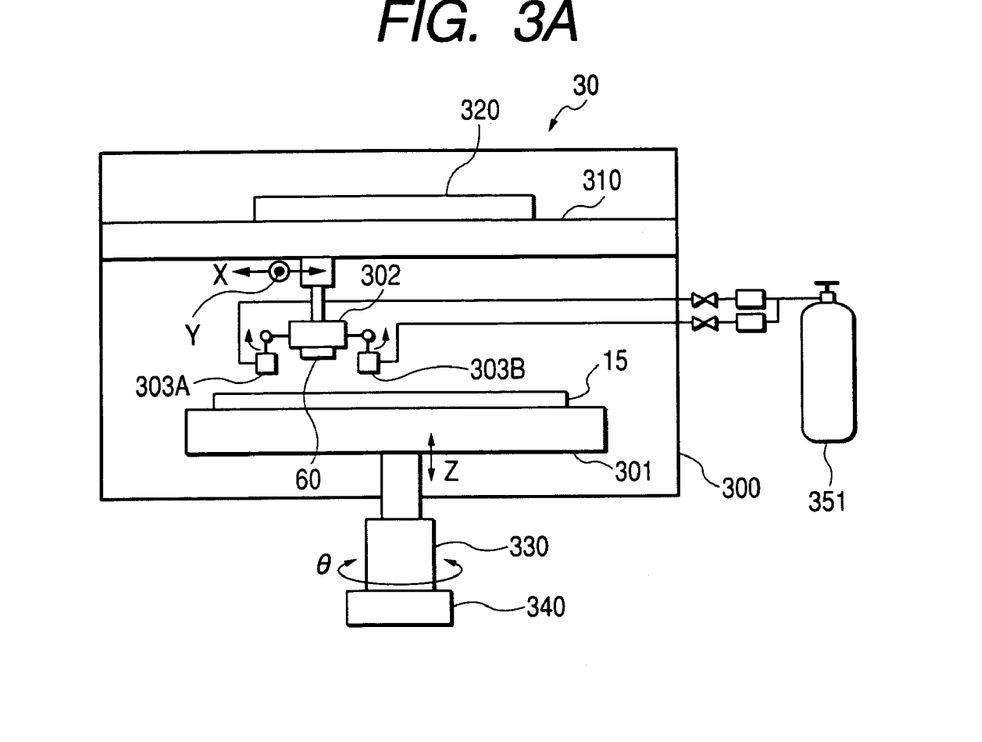
FIG. 3A is a view showing an example of a manufacturing apparatus used for the manufacturing method for the three-dimensional structural body of the invention.
Figure 3B:
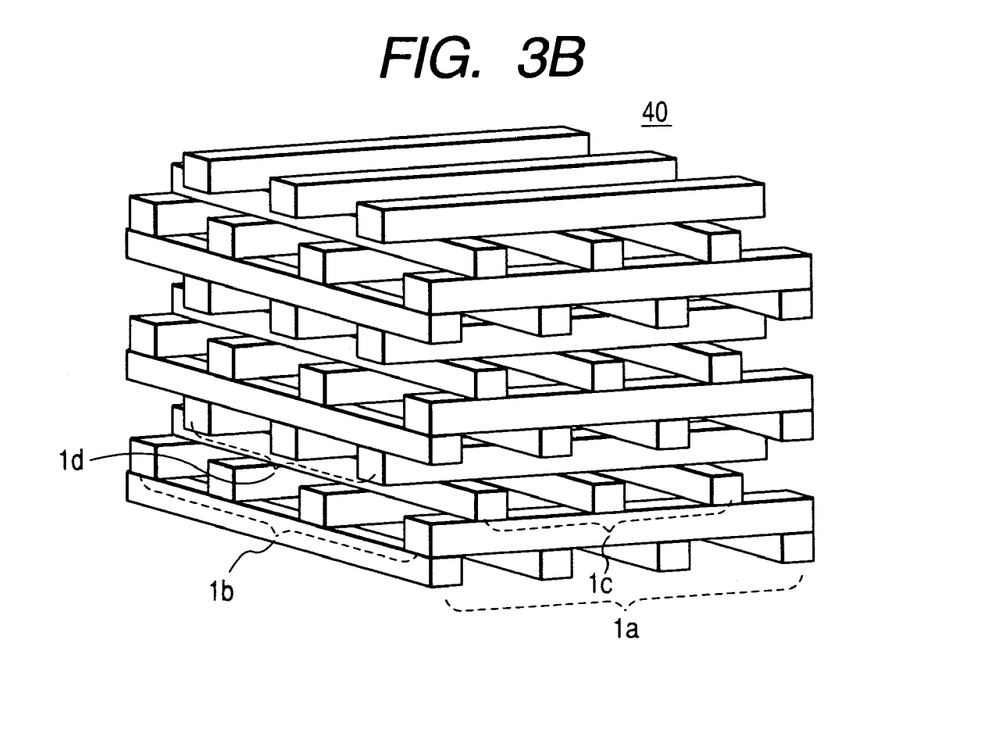
FIG. 3B is a view showing an example of a woodpile type three-dimensional photonic crystal.

FIG. 3A is a view showing an example of a manufacturing apparatus used for the manufacturing method for the three-dimensional structural body of the invention, and FIG. 3B is a view showing an example of a woodpile type three-dimensional photonic crystal fabricated by this.

As shown in FIG. 3A, this manufacturing apparatus 30 includes a vacuum tank 300 in which a laminating step is performed, and in the inside of the vacuum tank 300, there are disposed a substrate holder 301 on which the pattern member (donor substrate) 15 as shown in FIG. 1B is mounted, a stage 302 for holding a second substrate (target substrate) 60 to which the cross-sectional form members 1 formed in the pattern member 15 are transferred, a first FAB source 303A attached to this stage 302 and for subjecting the stage 302 side to an FAB treatment, a second FAB source 303B for subjecting the pattern member 15 side to an FAB treatment, an X-axis table 310 for moving the stage 302 by an X-axis motor (not shown) in an X-axis direction (horizontal direction in the drawing), and a Y-axis table 320 for moving the stage 302 by a Y-axis motor (not shown) in a Y-axis direction (direction vertical to the paper plane in the drawing). Incidentally, after the FAB treatment is ended, the first and the second FAB sources 303A and 303B are retracted by rotating arms by about 90° in arrow directions in the drawing by a retracting motor. Here, the "FAB treatment" is a treatment to form a clean surface by accelerating, for example, an argon gas as a particle beam by a voltage of about 1 kV to irradiate the surface of a material, and by removing an oxide film and an impurity on the surface of the material. In this embodiment, the irradiation condition of the FAB can be changed in the range of, for example, an acceleration voltage of 1 to 1.5 kV and an irradiation time of 1 to 10 minutes according to the material of the object to be treated.

Besides, the manufacturing apparatus 30 includes, at the outside of the vacuum tank 300, a Z-axis table 330 for moving the substrate holder 301 by a Z-axis motor (not shown) in a Z-axis direction (vertical direction in the drawing), a θ table 340 for rotating the substrate holder 301 around a Z axis by a θ motor at the time of alignment adjustment, and an argon gas bomb 351 for supplying an argon gas to the first and the second FAB sources 303A and 303B.

FIG. 3B is a view showing an example of a woodpile type three-dimensional photonic crystal. A three-dimensional photonic crystal 40 of this embodiment is such that plural cross-sectional form members 1a, 1b, 1c, 1d . . . are sequentially piled up like a woodpile (building block) on a not-shown substrate so that the directions of stripe patterns cross each other at right angles. Hereinafter, the manufacturing method of the invention will be described in detail.

Figure 4A:
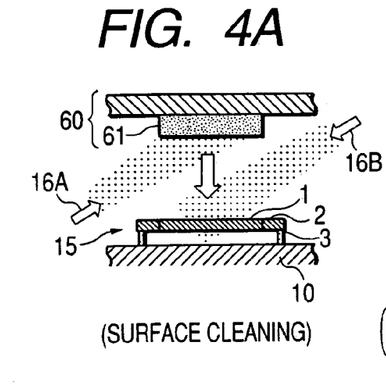
FIGS. 4A to 4G are views showing an embodiment of the manufacturing method for the three-dimensional structural body of the invention.

FIGS. 4A to 4G are views showing the embodiment of the manufacturing method for the three-dimensional structural body according to the invention. First, as shown in FIG. 4A, the pattern member 15 in which the plural cross-sectional form members 1 are formed is used as a donor substrate in surface-activated bonding, and this donor substrate 15 is mounted in the manufacturing apparatus 30 so that this substrate faces the second substrate (target substrate) 60. Although the plural cross-sectional form members 1 are formed, the drawing shows one of them. On the other hand, the target substrate 60 includes a mesa part 61 at the donor substrate 15 side. In this case, the target substrate 60, together with the mesa part, is made of InP. When a three-dimensional structural body formed after completion of laminating of the cross-sectional form members is desired to be removed from the target substrate, as described later, an InGaAs 64 as a sacrificial layer may be formed by the MOCVD method on a target substrate 62 having a mesa shape 63 made of InP. By doing so, after the completion of the laminating, the three-dimensional structural body can be detached from the target substrate by etching only the InGaAs. The height of the mesa part 61 from the flat portion of the target substrate 60 is made, for example, about 15 μm. The top of the mesa part 61 is flat, and has an area nearly equal to or slightly larger than one of the cross-sectional form members 1.

Figure 4B:
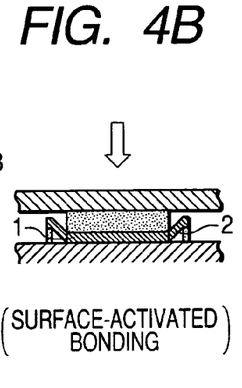
Figure 4C:
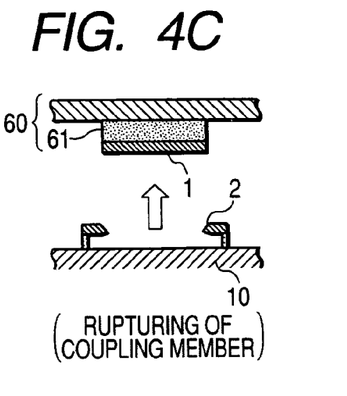

Both surfaces of the donor substrate 15 and the target substrate 60 facing each other are cleaned by FAB treatments (irradiation of an ion beam or the like) 16A and 16B. Next, positioning of both is performed, and the target substrate 60 is moved to be brought into contact with the cross-sectional form member 1 of the donor substrate 15 (pattern member). At this time, as shown in FIG. 4B, the target substrate 60 is continued to be pressed to the cross-sectional form member 1 until the coupling member 2 is deflected. By this, pressure welding is performed to the target substrate 60 and surface-activated bonding is performed by using reaction of the cross-sectional form member 1 to push the target substrate 60, and reaction generated when the cross-sectional form member is pressed to the surface of the first substrate (InP substrate) 10 whose surface is exposed by the foregoing undercut etching.

Figure 4D:
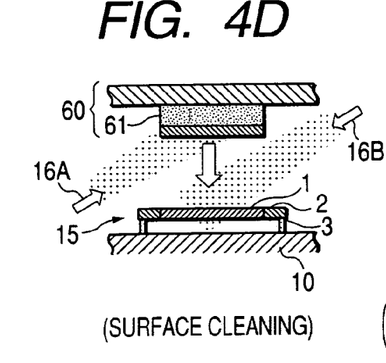
Figure 4E:
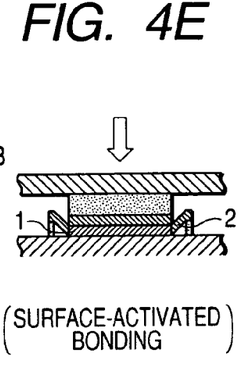
Figure 4F:
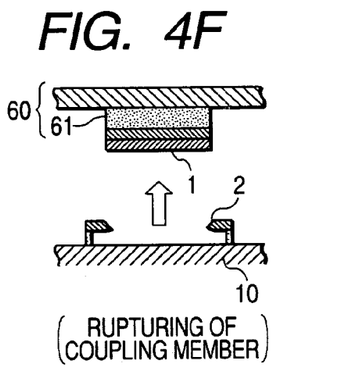
Figure 4G:
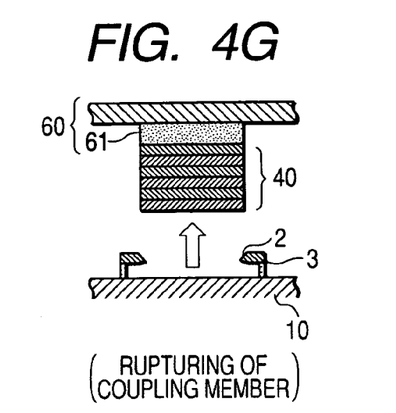

Thereafter, the cross-sectional form member 1 bonded to the target substrate 60 is pulled up, and by this, the coupling member 2 is ruptured, and the cross-sectional form member 1 is cut off from the donor substrate 10. Next, the target substrate 60 is moved, and the respective steps are repeated. That is, as shown in FIGS. 4D to 4F, the cross-sectional form members 1 are bonded and transferred and are laminated on the target substrate 60 so that the stripe patterns cross each other at right angles. Further, these steps are alternately repeated, so that the three-dimensional photonic crystal 40 as shown in FIG. 4G is fabricated. Incidentally, in this embodiment, at time of laminating the cross-sectional form members 1, the target substrate 60 is moved, however, the donor substrate 15 may be moved.

Besides, in this embodiment, although the mesa top part of the target substrate 60 is made to have the area nearly equal to or slightly larger than one of the cross-sectional form members 1, when the target substrate 60 is pressed to the donor substrate 15, in the case where the donor substrate 15 is constructed to include the plural cross-sectional form members 1 between the columnar members 4, and the target substrate 60 and the columnar members 4 do note interfere with each other, the plural cross-sectional form members can be transferred by one bonding/transferring step, and accordingly, in such a case, the area of the top of the mesa part of the target substrate 60 can be made large, and the workability can be improved at the same time as mass production.

Embodiment 2

FIGS. 5A to 5E are views showing another embodiment of a manufacturing method for a three-dimensional structural body according to the invention. In this embodiment, a plurality of the foregoing woodpile type three-dimensional photonic crystals of the embodiment 1 are fabricated at the same time.

Figure 5A:
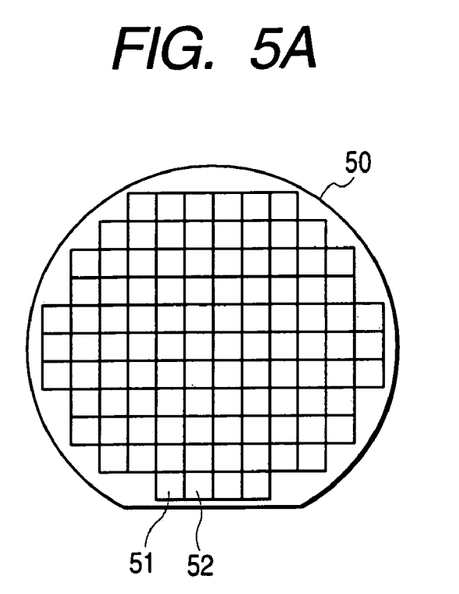
FIGS. 5A to 5E are views showing another embodiment of a manufacturing method for a three-dimensional structural body of the invention.
Figure 5B:
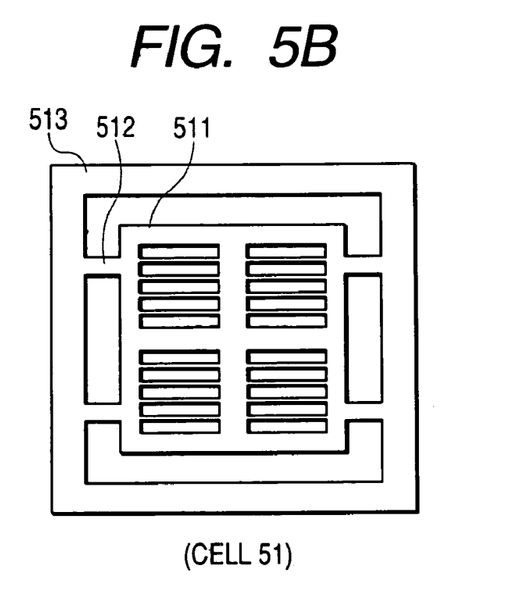
Figure 5C:
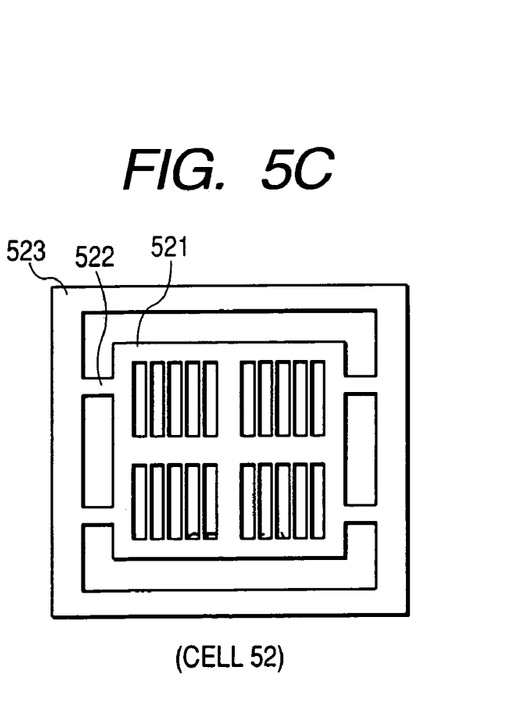

In this embodiment, as shown in FIG. 5A, a cell in which patterns of the same layer are collected among plural cross-sectional form members constituting a three-dimensional photonic crystal is defined on a pattern member 50 constituted by InP/InGaAs/InP similar to the embodiment 1, and this cell is developed and arranged on the pattern member 50 two-dimensionally at a predetermined pitch. For example, as shown in FIG. 5B, a cell 51 in the drawing includes a collective 511 of four cross-sectional form members, coupling members 512 connected to this collective 511, and a frame member 513 for holding the collective 511 through the coupling members 512. As shown in FIG. 5C, a cell 52 includes a collective 521 of four cross-sectional form members each having a stripe pattern crossing the stripe pattern of the cell 51 at right angles, coupling members 522 connected to this collective 521, and a frame member 523 for holding the collective 521 through the coupling members 522.

The cell in the pattern member 50 is fabricated similarly to the cross-sectional form member of FIG. 1. That is, an InP/InGaAs/InP multilayer film is obtained by sequentially growing an InGaAs spacer layer (sacrificial layer) and an InP layer by the MOCVD method on an InP substrate as a first substrate. From the multilayer film of InP/InGaAs/InP, by using a semiconductor micromaching process, the pattern member having the cross-sectional form members is fabricated as follows. First, plural collectives 511 and 521 each including four cross-sectional form members having a two-dimensional microstructure are fabricated by electron beam exposure and dry etching on the MOCVD growth InP layer. At this time, the coupling members 512 and 522 connected to the collectives 511 and 512 of the cross-sectional form members, and the frame members 513 and 523 for holding the collectives 511 and 521 of the cross-sectional form members through the coupling members 512 and 522 are fabricated at the same time. Although the directions of the stripe patterns of the cross-sectional form members in the same cell are the same, they are formed so as to cross the stripe patterns of the cross-sectional form members in the adjacent cell at right angles. Next, the InGaAs spacer layer (sacrificial layer) in the under layer of the collectives 511 and 521 of the cross-sectional form members and the coupling members 512 and 522 are removed by the undercut etching. By this, similarly to the case of FIG. 1, the collectives 511 and 521 of the cross-sectional form members are held in space by the frame members 513 and 523 through the coupling members 512 and 522.

Figure 5D:
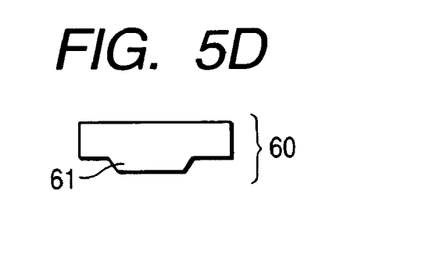
Figure 5E:
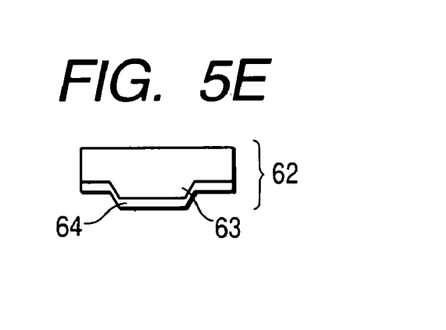

In this embodiment, the pattern member 50 formed in this way is used as a donor substrate, this is made to face a second substrate (target substrate) 60 as shown in FIG. 5D, and steps similar to the steps shown in FIGS. 4A to 4G are repeated, so that plural three-dimensional photonic crystals are fabricated on the target substrate 60 at the same time. As shown in the drawing, the target substrate 60 includes the mesa part 61. The target substrate 60, together with the mesa part, is made of InP. Besides, when the three-dimensional structural body formed after the completion of laminating of the cross-sectional form members is desired to be detached from the target substrate, as shown in FIG. 5E, the InGaAs 64 as a sacrificial layer may be formed by the MOCVD method on the target substrate 62 having the mesa shape 63 made of InP. By doing so, after the laminating is completed, the three-dimensional structural body can be detached from the target substrate by etching only the InGaAs. The height of the mesa part 61 from the flat portion of the target substrate 60 is about 15μ. The top of the mesa part 61 is flat, and has an area nearly equal to or slightly larger than one of the collectives 511 and 521 of the cross-sectional form members. The plural fabricated three-dimensional photonic crystals are separated later. In FIGS. 5A to 5E, although the example has been described in which the plural photonic crystals having the same structure are fabricated, plural photonic crystals having structures different from each other can also be fabricated.

Embodiment 3

Figure 6A:
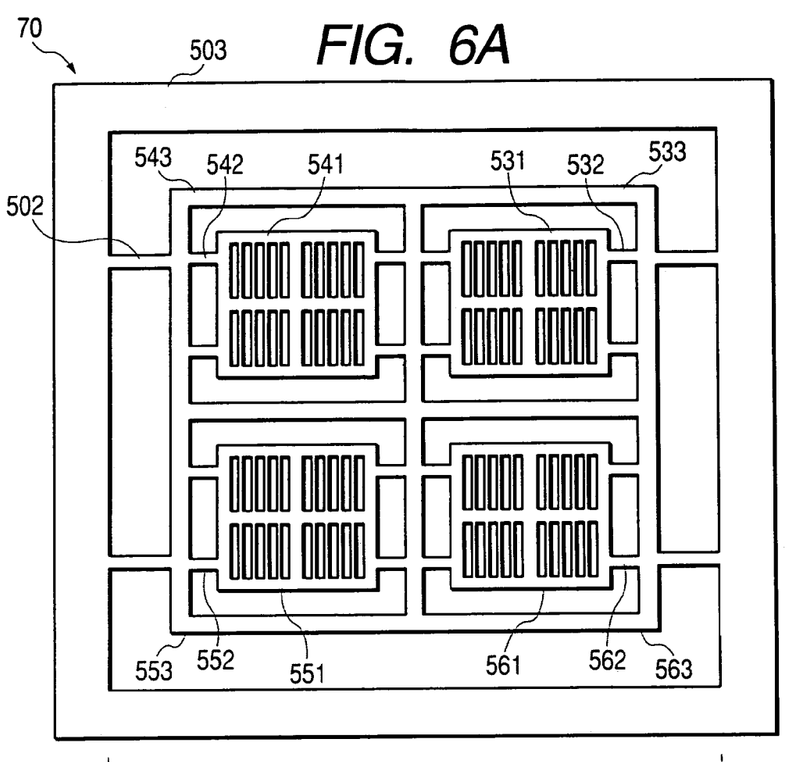
FIGS. 6A and 6B are views showing another embodiment of a manufacturing method for a three-dimensional structural body of the invention.
Figure 6B:
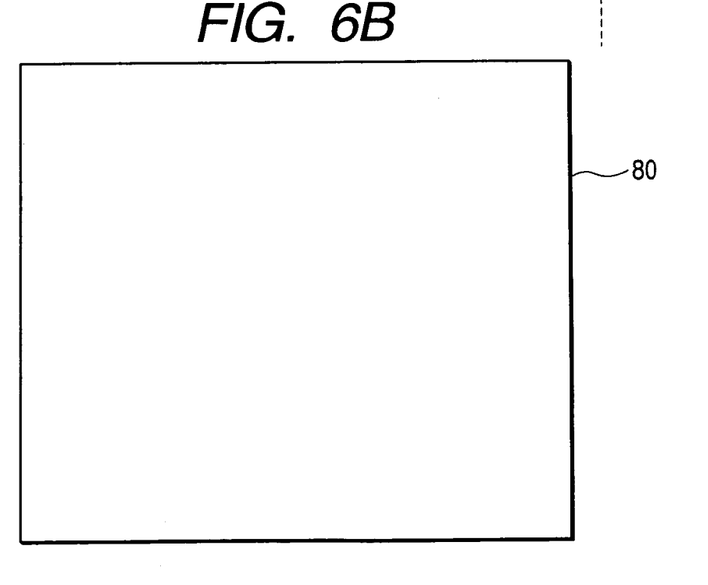

FIGS. 6A and 6B are views showing another embodiment of a manufacturing method for a three-dimensional structural body according to the invention. Also in this embodiment, a plurality of the foregoing woodpile type three-dimensional photonic crystals of the embodiment 1 are fabricated at the same time. In this embodiment, a plurality of the collectives of the cross-sectional form members of the embodiment 2 are provided, and these are held by a frame member through coupling members. In this embodiment, as shown in FIG. 6A, a pattern member 70 includes a first frame member 503 surrounding the whole of collectives 531, 541, 551 and 561 of plural cross-sectional form members, second frame members 533, 543, 553 and 563 individually surrounding the collectives 531, 541, 551 and 561 of the cross-sectional form members, second coupling members 502 for coupling the second frame members to the first frame member, and first coupling members 532, 542, 552 and 562 for individually coupling the collectives of the cross-sectional form members to the second frame members.

FIG. 6B shows a second substrate 80. In the b'bonding/transferring step, the whole of the inside of the first frame member 503 is sequentially transferred onto the second substrate 80. Incidentally, the first frame member 503 is provided on a not-shown first substrate, and a gap occurs between at least the inside portion of the first frame member 503 and the first substrate. The second coupling members 502 are ruptured in the process of the bonding/transferring, and the three-dimensional periodic structural body is formed in the inside of the first frame member 563 through the first coupling members. After the laminating is completed, the first coupling members are mechanically cut, and the plural three-dimensional periodic structural bodies are taken out from the second frame members. By this, the plural three-dimensional structural bodies can be fabricated at the same time. At this time, it is not always necessary to separate the three-dimensional structural bodies from the second frame members, and the frame members can also be used as chassis of the three-dimensional structural bodies as the need arises. On the contrary, in the case where they are separated, when the formation positions of the first coupling members are made different for the respective cells, the cutting becomes easy.

According to the manufacturing method for the three-dimensional structural body of the invention, in the state where the cross-sectional form members constituting the three-dimensional structure are held by the holding member, they are sequentially bonded and transferred onto the second substrate and laminating is carried out, and accordingly, as compared with the case where individual minute slice patterns are laminated by micromanipulation, it becomes possible to efficiently laminate the cross-sectional form members. That is, in the micromanipulation method, since the cross-sectional form members separated from the holding member is held at a point (0 dimension) and is handled, in the cross-sectional form member, a position shift which is difficult to predict occurs in the three-dimensional direction (up and down, right and left) with respect to the arrangement before the separation, and the plural cross-sectional form members with random directions are relatively positioned and are laminated, so that a very long adjustment step is required. However, according to the invention, the cross-sectional form member is held on the plane (two dimensions) above the first substrate, and the plural cross-sectional form members are sequentially laminated on the second substrate, and accordingly, the degree of position shift occurring in each of the cross-sectional form members is very small, and the laminating step can be continuously performed under minute position correction, so that it is very efficient. Further, since the cross-sectional form member is held in space, the material of the cross-sectional form member is not limited by the material of a layer (for example, a sacrificial layer) positioned between the cross-sectional form member and the first substrate. As a result, it becomes possible to efficiently manufacture various three-dimensional periodic structural bodies.

In the invention, it may be preferable that the bonding/transferring is performed using surface-activated bonding. By performing the surface-activated bonding, it becomes unnecessary to bond the cross-sectional form members by using anneal welding or the like, and strong bonding can be simply obtained. Besides, since heating is not required, it is possible to easily perform bonding of materials different from each other in thermal expansion coefficient. Incidentally, the surface-activated bonding is a method in which oxide films and impurities on the surfaces of members to be bonded are removed in vacuum by an FAB (Fast Atom Bombardment) process or the like to perform cleaning, and then, the cleaned surfaces are brought into contact with each other, so that the members are bonded.

When the holding member includes a coupling member connected to the cross-sectional form member, and a frame member provided between the coupling member and the first substrate, it becomes easy to hold the cross-sectional form member in space. Incidentally, the coupling member may be made of a material identical to the cross-sectional form member or a material different therefrom. Here, it is preferable that each of the cross-sectional form members is connected to the frame member through the plural coupling members. This is because if one coupling member is used, in the case where the cross-sectional form member is thin, when the second substrate approaches, a side of the cross-sectional form pattern where coupling is not performed rises by the attractive force or repulsive force of static electricity or the like, and there is a case where location accuracy at the time of laminating is lowered.

It may be preferable that the frame member includes a columnar part provided on the first substrate, and a frame part provided on the columnar part and connected to the coupling member.

It may be preferable to provide a step in which a sacrificial layer and a material layer are laminated on the first substrate, the cross-sectional form members, the frame part and the coupling member are formed in the material layer, and then, the sacrificial layer is removed while a portion becoming the columnar part remains, and a gap occurs at least between the cross-sectional form members and the first substrate. By doing so, it is possible to easily form the pattern member in which the cross-sectional form members are held in space.

At this time, it may be preferable that the cross-sectional form members are formed (patterned) by using a lithography method in order to form the cross-sectional form members with high accuracy. As the lithography method, it is possible to use photolithography, electron beam lithography, lithography by MEMS technique or the like. Besides, as a method of removing the sacrificial layer, it is preferable to remove the layer by using an under etching method in order to remove the sacrificial layer under the minute cross-sectional form members.

When the material layer and the sacrificial layer are constructed by semiconductors having different etching rates to a specified etchant, the cross-sectional form members can be patterned with high accuracy by a semiconductor process in which a micromachining technique is established, and when the sacrificial layer is removed by the under etching, it becomes possible by one process to hold the cross-sectional form members in space in the state where part of the sacrificial layer remains as the support member.

When the coupling member is constructed to be ruptured at the time of bonding/transferring, it becomes unnecessary to provide a step of separating the three-dimensional structural body from the frame member after the laminating step by the bonding/transferring is ended.

It may be preferable that the bonding/transferring is performed by causing the cross-sectional form members to face the second substrate, and by sandwiching the cross-sectional form members between the first substrate and the second substrate. By doing so, it becomes possible to add a high pressure between the cross-sectional form members, and the bonding state can be improved. Especially, like the photonic crystal, in the case where it is necessary to form a periodic structure with high accuracy, when the cross-sectional form members are merely bonded to each other by contact, there is a case where partial rising occurs between the members so that an abnormality occurs in a periodic structure, and a desired photonic band structure can not be obtained. Accordingly, it is especially preferable to sandwich the members between the first substrate and the second substrate and to perform pressure welding.

In the case where the bonding/transferring step is performed in this way, it may be preferable that the coupling member is ruptured after the cross-sectional form member is transferred onto the second substrate and when the second substrate is separated from the first substrate. In case the coupling member is ruptured in a period when the cross-sectional form member held by the coupling member in space is pressed to the first substrate side by the second substrate, there is a case where the position of the cross-sectional form member dropped on the first substrate is shifted in the horizontal direction. Thus, the cross-sectional form members are sandwiched between the second substrate and the first substrate, the cross-sectional form members are sufficiently bonded to each other, and the coupling part is ruptured when the second substrate is pulled up, so that the position shift in the horizontal direction can be prevented. In order not to cut the coupling member at the time of the pressing, and in order to rupture it when pulled up, there is a method in which a distance between the first substrate and the cross-sectional form member (that is, the height of the columnar member) is suitably set in a range where it is not ruptured through the material ductility of the coupling member, the shape of the coupling member is formed into a two-dimensional spring shape (bellows shape, etc.) which can be expanded and contracted by the pressing corresponding to approximately the interval between the cross-sectional form member and the first substrate and is ruptured when the second substrate is lifted more highly than that, or a cutting blade is put to the coupling member when it is pulled up.

At the time of carrying out sandwiching, in order to apply pressure evenly to the cross-sectional form member between the first substrate and the second substrate, it may be preferable that the surface of the first substrate facing the cross-sectional form member is flat. Besides, in the case where a resin layer is contained in the first substrate, since there is a fear that it is elastically deformed and pressure is not applied to the whole cross-sectional form member, it is desirable that the first substrate is made of a material which is difficult to elastically deform, so that the pressure of sandwiching the cross-sectional form member between the first substrate and the second substrate is applied to the whole cross-sectional form member.

It is not always necessary that the first substrate is constituted by one material, and it may be constructed by plural layers. For example, in the case where it is desired that a function as an etching stop layer at the time when the sacrificial layer is removed is differentiated from a function as the support substrate, laminating is performed by bonding of single-layer films, thin film formation with crystal growth, evaporation, or deposition, or the like and the first substrate can also be used.

The holding member may also include a first frame member positioned on the first substrate, a second frame member provided inside of the first frame member, a first coupling member connected to the cross-sectional form members, and a second coupling member connecting the first and the second frame members. At this time, the second frame member and the plural cross-sectional form members (cell) connected to the second frame member can be simultaneously bonded and transferred onto the second substrate. When the pattern member is constructed in this way, it becomes possible to enlarge the size of the second substrate up to approximately the area of the cell, and further, in the bonding/transferring, the plural cross-sectional form members and the second substrate are made to face each other, and the second frame member and the plural cross-sectional form members are sandwiched between the first substrate and the second substrate and are subjected to pressure welding, so that the cross-sectional form members can be brought into intimate contact with each other.

The three-dimensional structural body may include a photonic crystal having a periodic structure, and according to the manufacturing method of the invention, especially, various photonic crystals having the three-dimensional periodic structure can be manufactured efficiently and with a high degree of freedom in design.

When the cross-sectional form members are disposed on the first substrate so that the respective sections of plural different photonic crystals are developed, the plural different three-dimensional periodic structural bodies can be simultaneously fabricated. Besides, it is not necessary to separately perform positioning for each of the three-dimensional periodic structural bodies, and as long as the fabrication of the cross-sectional form members and the positioning at the time of the surface-activated bonding are performed with high accuracy, positioning can be performed at once for the respective layers of the plural photonic crystals with high accuracy. Thus, the number of fabrication steps is greatly reduced as compared with the related art, and the three-dimensional periodic structural body having a high degree of freedom can be easily fabricated.

According to the invention, the manufacturing method for the three-dimensional structural body can be obtained which can manufacture the three-dimensional structural body efficiently on the basis of free design, while the limitation of the construction material is reduced.

The entire disclosure of Japanese Patent Application No. 2003-143530 filed on May 21, 2003 including specification, claims, drawings and abstract is incorporated herein by reference in its entirety.

What is claimed is:

1. A manufacturing method for a three-dimensional photonic crystal, comprising:
   A. holding, by a first holding member, a first cross-sectional form member from amongst a plurality of cross-sectional form members above a first substrate, a pattern member comprising the first holding member and the first cross-sectional form member;
   B. first bonding/transferring and laminating the first cross-sectional form member onto a second substrate;
   C. releasing the first cross-sectional form member from the first holding member after the first bonding/transferring and laminating;
   D. holding, by a second holding member, a second cross-sectional form member from amongst the plurality of cross-sectional form members above the first substrate;
   E. second bonding/transferring and laminating the second cross-sectional form member onto the first cross-sectional form member;
   F. releasing the second cross-sectional form member from the second holding member after the second bonding/transferring and laminating;
   repeating steps D, E and F, at least once, wherein, for each repetition, the "second holding member" becomes a new holding member and the "second cross-sectional form member" becomes a new cross-sectional form member from amongst the plurality of cross-sectional form members and the "first cross-sectional form member" becomes the second cross-sectional form member from a previous repetition, respectively, wherein
   each cross-sectional form member corresponds to a slice pattern of the three-dimensional photonic crystal,
   each cross-sectional form member comprises a plurality of longitudinal members separated by gaps from each other, each of the plurality of longitudinal members having two tips, one tip being connected to a lateral member, and the other tip being connected to another lateral member.

2. The manufacturing method according to claim 1, wherein the first or second bonding/transferring and laminating is performed using surface-activated bonding.

3. The manufacturing method according to claim 1, wherein the first or second holding member comprises a coupling member connected to a cross-sectional form member, and a frame member, wherein the first substrate is connected to the coupling member through the frame member.

4. The manufacturing method according to claim 3, wherein the frame member includes a columnar part provided on the first substrate, and a frame part provided on the columnar part and connected to the coupling member.

5. The manufacturing method according to claim 4, further comprising:
   laminating a sacrificial layer and a material layer on the first substrate;
   forming the cross-sectional form members, the frame part and the coupling member in the material layer; and
   removing the sacrificial layer while a portion becoming the columnar part remains, and a gap occurs at least between the cross-sectional form members and the first substrate.

6. The manufacturing method according to claim 5, wherein the plurality of cross-sectional form members are formed by using a lithography method.

7. The manufacturing method according to claim 5, wherein the sacrificial layer is removed by using an under etching method.

8. The manufacturing method according to claim 3, wherein the coupling member is ruptured at a time of the first or second bonding/transferring and laminating.

9. The manufacturing method according to claim 1, further comprising a collective of one or more cross-sectional form members, wherein
   the first or second bonding/transferring and laminating is performed by causing the collective of cross-sectional form members to face the second substrate, and by sandwiching the collective of cross-sectional form members between the first substrate and the second, substrate, and
   the collective comprises a plurality of cross-sectional form members connected by a lateral member so that the longitudinal members extend along a substantially same direction.

10. The manufacturing method according to claim 3, further comprising a collective of one or more cross-sectional form members, wherein
   the first or second bonding/transferring and laminating is performed by causing the collective of cross-sectional form members to face the second substrate, and by sandwiching the collective of cross-sectional form members between the first substrate and the second substrate,
   the coupling member is ruptured after the collective of cross-sectional form members are transferred on the second substrate and when the second substrate is separated from the first substrate, and
   the collective comprises a plurality of cross-sectional form members connected by a lateral member so that the longitudinal members extend along a substantially same direction.

11. The manufacturing method according to claim 9, wherein a surface on the first substrate facing the collective of cross-sectional form members is flat.

12. The manufacturing method according to claim 10, wherein a surface on the first substrate facing the collective of cross-sectional form members is flat.

13. The manufacturing method according to claim 9, wherein a pressure to sandwich the collective of cross-sectional form members between the first substrate and the second substrate is applied to all of the cross-sectional form members of the collective.

14. The manufacturing method according to claim 10, wherein a pressure to sandwich the collective of cross-sectional form members between the first substrate and the second substrate is applied to all of the cross-sectional form members of the collective.

15. The manufacturing method according to claim 1, wherein the first or second holding member comprises a first frame member positioned on the first substrate, a second frame member provided inside of the first frame member, a first coupling member connected to a cross-sectional form member, and a second coupling member connecting the first and the second frame members.

16. The manufacturing method according to claim 15, wherein the second frame member and a plurality of cross-sectional form members connected to the second frame member are simultaneously bonded and transferred onto the second substrate.

17. The manufacturing method according to claim 16, wherein the first and second bonding/transferring and laminating is performed by causing the second substrate and the plurality of cross-sectional form members connected to the second frame member to face each other, and by sandwiching the second frame member and the plurality of cross-sectional form members between the first substrate and the second substrate.

18. The manufacturing method according to claim 1, wherein the three-dimensional structural body includes a photonic crystal having a periodic structure.

19. A manufacturing method for a three-dimensional photonic crystal, comprising: sequentially bonding/transferring and laminating a plurality of cross-sectional form members onto a second substrate, each cross-sectional form member being held in space above a first substrate by a holding member, a pattern member comprising each of the cross-sectional form members and the respective holding members, and releasing the cross-sectional form member from the holding member after the bonding/transferring and laminating, wherein the holding member comprises a coupling member connected to a cross- sectional form member, and a frame member, wherein the first substrate is connected to the coupling member through the frame member, wherein the frame member includes a columnar part provided on the first substrate, and a frame part provided on the columnar part and connected to the coupling member; the manufacturing method further comprising: laminating a sacrificial layer and a material layer on the first substrate; forming the cross-sectional form members, the frame part and the coupling member in the material layer; and removing the sacrificial layer while a portion becoming the columnar part remains, and a gap occurs at least between the cross-sectional form members and the first substrate.

* * * * *